(12) United States Patent
Maltezos et al.

(10) Patent No.: US 7,814,928 B2
(45) Date of Patent: Oct. 19, 2010

(54) MICROFLUIDIC DEVICES AND RELATED METHODS AND SYSTEMS

(75) Inventors: George Maltezos, Fort Salonga, NY (US); Axel Scherer, Laguna Beach, CA (US)

(73) Assignee: California Institute of Technology, Pasadena, CA (US)

( * ) Notice: Subject to any disclaimer, the term of this patent is extended or adjusted under 35 U.S.C. 154(b) by 293 days.

(21) Appl. No.: 11/869,718

(22) Filed: Oct. 9, 2007

(65) Prior Publication Data

US 2008/0083465 A1    Apr. 10, 2008

Related U.S. Application Data

(60) Provisional application No. 60/850,472, filed on Oct. 10, 2006.

(51) Int. Cl.
*F15B 21/00* (2006.01)

(52) U.S. Cl. ............... 137/340; 137/341; 137/560; 700/300

(58) Field of Classification Search ........... 137/340, 137/341, 560, 806, 828, 833; 700/300; 251/335.2, 251/331
See application file for complete search history.

(56) References Cited

U.S. PATENT DOCUMENTS

| | | | | |
|---|---|---|---|---|
| 5,176,864 A | | 1/1993 | Bates et al. ............... 264/137 |
| 5,228,923 A | | 7/1993 | Hed ........................ 136/208 |
| 5,381,848 A | | 1/1995 | Trabucco .................. 164/102 |
| 5,740,051 A | | 4/1998 | Sanders et al. ............ 700/119 |
| 5,837,970 A | * | 11/1998 | Jilek ........................ 137/341 |
| 6,074,725 A | | 6/2000 | Kennedy .................. 428/188 |
| 6,193,471 B1 | | 2/2001 | Paul ......................... 417/53 |
| 6,875,619 B2 | | 4/2005 | Blackburn |
| 2001/0045358 A1 | | 11/2001 | Kopf-Sill et al. .......... 204/452 |
| 2002/0150683 A1 | * | 10/2002 | Troian et al. ............. 427/256 |
| 2003/0000835 A1 | | 1/2003 | Witt et al. |
| 2003/0015425 A1 | | 1/2003 | Bohm et al. |
| 2003/0235924 A1 | | 12/2003 | Adams et al. |
| 2004/0132218 A1 | | 7/2004 | Ho |
| 2004/0249227 A1 | | 12/2004 | Klapproth et al. |
| 2005/0006372 A1 | * | 1/2005 | Murakami et al. ......... 219/385 |
| 2006/0096691 A1 | * | 5/2006 | Bossi et al. ............... 156/73.1 |
| 2006/0204699 A1 | | 9/2006 | Maltezos et al. |
| 2006/0211134 A1 | * | 9/2006 | Kennedy et al. ........... 436/180 |
| 2006/0263818 A1 | | 11/2006 | Scherer et al. |

(Continued)

OTHER PUBLICATIONS

Kartalov, Emil P. et al. "Microfluidic device reads up to four consecutive base pairs in DNA sequencing-by-synthesis"in Nucleic Acids Research, 2004, 32 (9). pp. 2873-2879.

(Continued)

*Primary Examiner*—John Bastianelli
(74) *Attorney, Agent, or Firm*—Steinfl & Bruno (57) ABSTRACT

A microfluidic assembly comprising a replaceable microfluidic circuit and a thermal unit, the microfluidic circuit adapted to contact the thermal unit by contact between one or more membranes in the microfluidic circuit and the at least one temperature controlling element in the thermal unit to achieve temperature control of a substance or substances inside one or more fluidic compartments in the microfluidic circuit. A related method to control temperature and/or physical state of a substance in the fluidic compartments and related testing systems are also described.

29 Claims, 5 Drawing Sheets

U.S. PATENT DOCUMENTS

| | | |
|---|---|---|
| 2006/0288708 A1 | 12/2006 | Maltezos et al. |
| 2007/0012891 A1 | 1/2007 | Maltezos et al. |
| 2007/0045880 A1 | 3/2007 | Rajagopal et al. |
| 2008/0013092 A1 | 1/2008 | Maltezos et al. |
| 2008/0044887 A1 | 2/2008 | Maltezos et al. |
| 2008/0069733 A1 | 3/2008 | Maltezos et al. |
| 2008/0083465 A1 | 4/2008 | Maltezos et al. |
| 2008/0133267 A1 | 6/2008 | Maltezos et al. |
| 2008/0142157 A1 | 6/2008 | Maltezos et al. |
| 2008/0145286 A1 | 6/2008 | Maltezos et al. |
| 2008/0190830 A1 | 8/2008 | Maltezos et al. |

OTHER PUBLICATIONS

Unger, Marc A. et al. "Monolithic Microfabricated Valves and Pumps by Multilayer Soft Lithography" in Science Apr. 7, 2000, vol. 288. No. 5463, pp. 113-116.

Kartalov, Emil P. et al. "High throughput multi-antigen microfluidic fluorescence immunoassays" in Biotechniques, 2006, vol. 40, No. 1, pp. 85-90.

Basic Miclofluidic Concepts, retrieved Oct. 13, 2005 from http://faculty.washington.edu/yegerp/microfluidicstutorial/basicconcepts.htm.

Chiem, N.H., et al., "Microchip-based capillary electrophoresis for immunoassays: analysis of monoclonal antibodies and theophylline", Electrophoresis 19, 3040 (1998).

Chou, H.P., et al. "A Microfabricated Rotary Pump", Biomedical Microdevices 3, 323 (2001).

Clark, A.M., et al., "Cooling of bulk material by electron-tunneling refrigerators", Applied Physics Letters 86, 173508 (2005).

Fan, X., et al., "SiGeC/Si superlatice microcoolers", Applied Physics Letters, vol. 78, No. 11, pp. 1580-1583 (Mar. 12, 2001).

Fiedler, S., et al., "Dielectrophoretic sorting of particles and cells in a microsystem", Anal. Chem. 70, 1909 (1998).

Fu, A.Y., et al., "A micro fabricated fluorescence-activated cell sorter", Nature Biotech. 18, 309, 309 (2000).

Godfrey, S., "Electronics Cooling: An introduction to the thermostatic coolers", retrieved Oct. 10, 2005 from http://www.electronics-cooling.com/Resources/EC_Articles/SEP96.

Hadd, A.G., et al., "Microchip device for performing enzyme assays", Anal. Chern. 69,3407 (1997).

Ikuta, K., et al., "Biochemical IC chip toward cell free DNA protein synthesis", HEMS 2000, Miyakazi, Japan,pp. 131-136 (Jan. 23-27, 2000).

Ikuta, K., et al:, Fluid drive chips containing multiple pumps and switching valves for Biochemical IC Family, MEMS 1998, Heidelberg Germany, pp. 739-744 (Jan. 25-29, 1998).

Jeon, N.L., et al., "Microfluidics Section: Design and Fabrication of Integrated Passive Valves and Pumps for flexible Polymer 3-dimensional Microfluidic systems", Biomedical Microdevices 4:2, pp. 117-121 (2002).

Kopp, M.U., et al., "Chemical amplification: continuous flow PCR on a chip", Science 280, 1046 (1998).

Lagally, E. T., et al., "Monolithic integrated microfluidic DNA amplification and capillary electrophoresis analysis system", Sensors and Actuators B-chemical 63 (3) : 138-146 (May 15, 2000).

Lee. J., et al., "Two Phase flow in high heat flux microchannel heatsink for refrigeration cooling applications: Part II-heat transfer characteristics", International Journal of Heat and Mass Transfer, 48, pp. 941-955 (2005).

Lee, H., et al., "Package embedded heat exchanger for stacked multi-chip module" retrieved Dec. 20, 2006 from http://www.mrs.org.sg/icmat2005/downloads/SymFTemplate.pdf.

Li, P.H., et al., "Transport, manipulation and reaction of biological cells on-chip using electrokinetic effect"; Anal. chem 69, 1564 (1997).

Liu, J., et al., Electrophoresis, 23, 1531 (2002).

Morgan, H., et al., "Large Area travelling-wave dielectrophoresis particle seperator", Journal of Microengineering, 7, 65 (1997).

Peltier-Seebeck Effect-wikipedia, retrieved Oct. 10, 2005 from http://en.wikipedia.org/wiki/Peltier-Seebeck_effect.

"Peltier Coolers", retrieved Oct. 10, 2005 from http://www.digit-life.com/articles/peltiercoolers/.

Quake S. R., et al, "From Micro to Nano Fabrication with Soft Materials", Science 290, 1536 (2000).

Thorsen, T., et al., "Microfluidic Large-Scale Integration", Science 298,5593 (2002).

Unger, M.A., et al., "Monolithic Microfabricated Valves and Pumps by Multilayer Soft Lithography", Science 288, 113 (2000).

Waters, L.C., et al., "Microchips devices for cell lysis, multiplex PCR amplification and electrophoretic sizing", Anal. Chem. 70. 158 (1998).

Wu, H.K., et al., "Fabrication of complex three-dimensional microchannel systems in PDMS", Journal of TE American Chemical Society 125 (2), pp. 554-559 (Jan. 15, 2003).

Piyasena Menake E., et al. "Near-Simultaneous and Real-Time Detection of Multiple Analytes in Affinity Micro columns" in Anal. Chem. 2004, 76, 6266-6273.

Hernandez L. et al. "Determination of Binding Constants of Polyethylene Glycol Vancomycin Derivatives to Peptide Ligands Using Affinity Capillary Electrophoresis" in Chromatographia Mar. 2007, vol. 65, No. 5-6.

PCT International Search Report for PCT/US2007/078689 filed on Sep. 18, 2007 in the name of California Institute of Technology, et al.

PCT Written Opinion for PCT/US2007/078689 filed on Sep. 18, 2007 in the name of California Institute of Technology, et al.

Inatomi, K., S. Izuo, S. Lee, H. Ohji, S. Shiono, Electrophoresis of DNA in micro-pillars fabricated in polydimethylsiloxane, Microelectronic Engineering, vol. 70 (2003) pp. 13-18.

\* cited by examiner

MICROFLUIDIC DEVICES AND RELATED METHODS AND SYSTEMS

CROSS REFERENCE TO RELATED APPLICATIONS

This application claims priority to U.S. Provisional Application Ser. No. 60/850,472 filed on Oct. 10, 2006, the content of all of which is incorporated herein by reference in its entirety.

STATEMENT OF GOVERNMENT GRANT

This invention has been made with U.S. Government support under Grant No. HR0011-04-1-0032 awarded by DARPA. The U.S. Government has certain rights in this invention.

TECHNICAL FIELD

The present disclosure relates to the field of fluidics and in particular to microfluidic devices and related methods and systems for performing microfluidics operations in a controlled fashion.

BACKGROUND

Microfluidic devices and systems are commonly used in the art for processing and/or analyzing of very small samples of fluids, such as samples in the 10 nl to about 5 ml size range. In such microfluidic devices and systems, the integration of many elements in a single microfluidic device has enabled the powerful and flexible analysis systems with applications ranging from cell sorting to protein synthesis. Some microfluidic operations that are functional to the performance of said applications include mixing, filtering, metering pumping reacting sensing heating and cooling of fluids in the microfluidic device.

Many different approaches have so far been explored for controlling said operations in a microfluidic environment, including combining thousands of lithographically defined components, such as pumps and valves, into chip based systems to achieve control over reagents concentrations and reactions' performance.

In particular, many different approaches have so far been explored for achieving thermal control in microfluidic devices, including the construction of resistive heating elements within fluidic chambers and immersing the entire chip into coolant. In particular, Applicants have described heating cooling devices for a microfluidic apparatus having a thermal insulating substrate in U.S. Pub. App. No. 2006/0288708, incorporated herein by reference in its entirety. In that application a Peltier device (i.e. a heating/cooling device having a Peltier junction) is located inside a microfluidic apparatus.

SUMMARY

Microfluidic devices and systems are disclosed herein, for controlling the temperature of a substance in a compartment of a microfluidic device.

According to a first aspect, a microfluidic assembly is disclosed, the microfluidic assembly comprising a replaceable microfluidic circuit and a thermal unit.

In the microfluidic assembly, the microfluidic circuit comprises one or more fluidic compartments, each comprised of a membrane, and the thermal unit comprises at least one temperature controlling element.

In particular, in the microfluidic assembly the microfluidic circuit is adapted to contact the thermal unit by contact between the one or more membranes and the at least one temperature controlling element to achieve temperature control of a substance or substances inside the one or more fluidic compartments.

In the microfluidic assembly, the thermal unit is external to the replaceable microfluidic circuit, and is configured to be maintained in the microfluidic assembly upon replacement of the replaceable microfluidic circuit, thus allowing multiple uses of the microfluidic assembly.

According to a second aspect, a method to control temperature and/or physical state of a substance is disclosed, the method comprising: providing a first, disposable microfluidic circuit comprising one or more fluidic compartments each connected to a membrane and introducing the substance in the one or more fluidic compartments. The method further comprises thermally coupling the one or more membranes with temperature controlling elements, replacing the first microfluid circuit with a second microfluidic circuit; and thermally coupling the second microfluidic circuit with the temperature controlling elements responsible for the previous thermal coupling of the first microfluidic circuit.

According to a third aspect a testing system is disclosed, the testing system comprising a thermal controlling element; and a microfluidic circuit, with the microfluidic circuit adapted to be removably coupled to the thermal controlling element to obtain a microfluidic assembly such as one described above.

According to a fourth aspect a testing system is disclosed, the testing system comprising: a thermal controlling element; and a plurality of microfluidic circuits. In the testing system each circuit of the plurality of microfluidic circuits is configured to be removably coupled with the thermal controlling element for a testing operation and to be replaced by a different circuit of the plurality of microfluidic circuits for a different testing operation.

According to a fifth aspect a system for controlling temperature inside fluidic compartments of a microfluidic circuit is disclosed, the system comprising one or more Peltier temperature controlling elements one or more membranes and a heath sink. In the system, the one or more Peltier temperature controlling elements external to the microfluidic circuit, the one or more membranes are connected to the fluidic compartments, and the heat sink connected to the one or more Peltier temperature controlling elements, the heat sink external to the microfluidic circuit, In the system, the membranes further interface between the microfluidic circuit and the Peltier temperature controlling elements and are configured for thermal exchange between the one or more Peltier temperature controlling elements and the fluidic compartments.

In the system wherein thermal exchange between the one or more Peltier temperature controlling elements and the fluidic compartments includes preservation of temperature inside the fluidic compartments.

The details of one or more embodiments herein disclosed are set forth in the accompanying drawings and the description below. Other features, objects, and advantages will be apparent from the description and drawings, and from the claims.

BRIEF DESCRIPTION OF THE DRAWINGS

The accompanying drawings, which are incorporated into and constitute a part of this specification, illustrate one or more embodiments of the present disclosure and, together with the detailed description, serve to explain the principles and implementations of the complexes, systems and methods herein disclosed.

In the drawings.

Like reference symbols in the various drawings indicate like elements.

DETAILED DESCRIPTION

A microfluidic assembly is disclosed, including a microfluidic device or chip and a thermal unit. The wording "microfluidic device", "microfluidic assembly", microfluidic systems" and the like is used herein to indicate devices, assembly and systems wherein samples for the processing and/or analysis of samples having a volume of from about 10 nl to about 5 ml. In some embodiments, the microfluidic chip is a device having dimensions ≦1 mm and is suitable for micro-applications.

Figure 1:
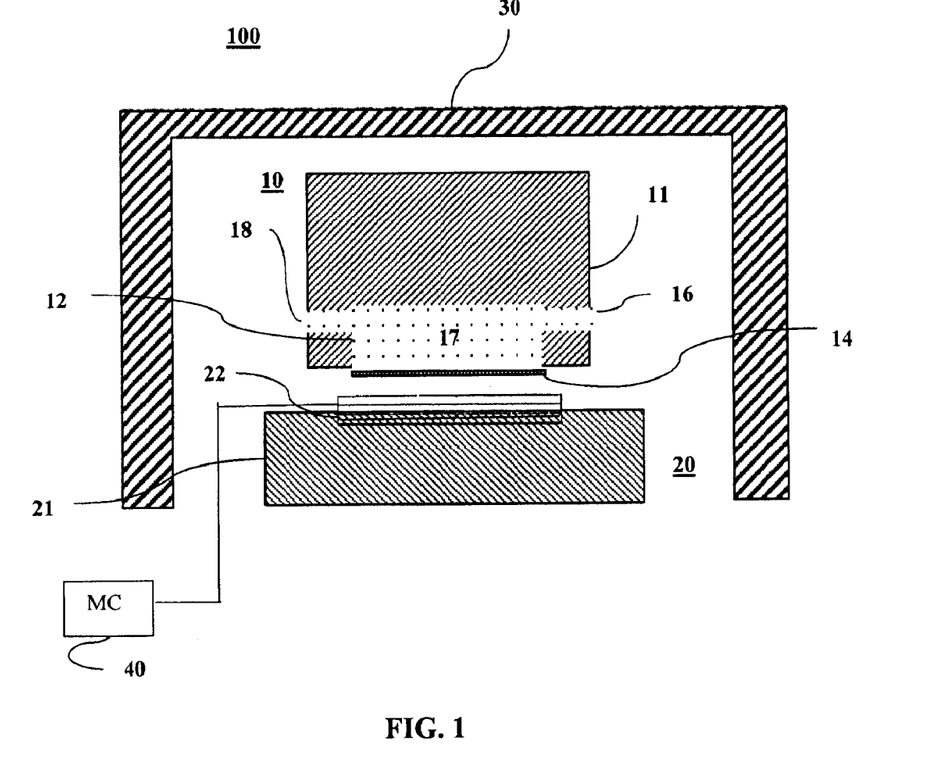
FIG. 1 shows a schematic illustration of a microfluidic assembly in cross sectional view, according to an embodiment herein disclosed.

In the exemplary illustration of FIG. 1, a microfluidic assembly (100) is illustrated comprising a microfluidic chip or circuit (10) and a thermal unit (20). In the assembly (100), the chip (10) and the thermal unit (20) are operatively connected to allow temperature control in one or more portions of the chip (10) as illustrated in further details below. In some embodiments, the microfluidic chip (10) is a disposable component while the thermal/cooling unit (20) is a multiuse component, i.e. a component that can be used multiple times.

By looking at the embodiment shown in FIG. 1, the person skilled in the art will understand that the embodiment shown is particularly advantageous for a prolonged use of the disclosed assembly in multiple sampling experiments, where the only element that is replaced every time is the chip or device (10). In other words, the assembly shown in FIG. 1 is very well suited for a low cost device given that the heating/cooling unit (22), e.g. a heating/cooling unit based on Peltier junctions, a resistive heating coil and/or a refrigerated cold plate, does not need to be replaced.

Multiple uses of the same heating/cooling unit (20) are mainly based on three factors. The first factor is that the heating/cooling element (22) is external to the microfluidic device (10). The second factor is that the heating/cooling unit (20) is removably connectable with the microfluidic device (10), thus allowing removal of the microfluidic device (10) from the assembly each time a new sample needs to be tested and/or a new experiment has to be performed. The third, optional, factor is that thermal connection between the heating/cooling device (22) and the one or more chambers (17) of the microfluidic device (10) occurs along a top surface or bottom surface of the compartments (12) inside the microfluidic device (10).

In the schematic illustration of FIG. 1, the chip (10) is shown including a fluidic compartment or vessel (12) within a matrix (11). On the other hand, as already mentioned above, the thermal unit (20) includes a heating/cooling element (22) based on Peltier junctions, the element (22) associated with a heat sink (21). The fluidic compartment (12) is operatively connectable to the thermal unit (20) by way of a thin membrane (14) configured to be matingly engaged with the heating/cooling element (22) of the thermal unit (20) to maximize temperature control of the substances inside the compartment (12). The heating/cooling unit in FIG. 1 is connectable to a microcontroller (40) used to monitor and/or control the desired temperature in chamber (12). The membrane can be, for example, 200 nm to 4 mm thick and can be made of a material such as PDMS, SIFEL, polymer, plastics, elastomer or an injection molded plastic. The person skilled in the art will understand the presence of a balance between thickness and thermal conductivity of the membrane. In other words, heat is easier to be conducted with thin membranes, but the thinner the membrane the higher the chance for such membrane to break after an undesired short number of uses of the assembly. The applicants have noted that one of the best behaviors of the membrane (14) occurs when the substance (17) inside the compartment(s) (12) is in a frozen state.

In particular, the shape, location and configuration of the fluidic compartment (12) and thin membrane (14) can be designed to removably match with the Peltier element (22), to maximize the extent of the mating/matching surfaces of the two elements (12) and (22). In the exemplary embodiment schematically illustrated in FIG. 1, the vessel (12) can be formed with one side flat and with a thin polymer membrane (14) on the flat side of the compartment (12), protecting the compartment (12) from the outside environment. In particular, in the embodiment of FIG. 1, the fluidic chip (10) is designed such that it can mate with a heat sink (21) which has been machined in order to accept a heating/cooling device, e.g. a standard Peltier chip or element (22) such that the Peltier chip (22) can be held slightly above the surface of the heat sink (21) or a surface which can have a thin film heater on it, in particular for applications wherein prompt use is desired.

In the microfluidic assembly (100), the substance of interest (17) can be introduced in the fluid compartment (12) in a predetermined state that is controllable by way of temperature modifications. The substance of interest (17) can be any substance whose state is affected by temperature variation within the range controllable by the Peltier element (22).

Exemplary states of the substance of interest include but are not limited to frozen state, liquid state, powder state and so on.

When in its operating state, the heating/cooling unit (22) is mated with the thin membrane (14) so to control the temperature of the substance of interest (17) in the fluid compartment (12). In particular, the temperature of the substance of interest (17) can be controlled so to be maintained or modified. In some embodiments, also the state of the substance of interest (17) can be controlled. In some embodiments the substance of interest is a solution that can freeze between room temperature and about −20° C. e.g. a water solution.

In particular, in some embodiments the fluidic chip (10) will be mated with the heat sink (21) such that the fluid cell (12) is above the Peltier element or heater (22) and in thermal contact with heater (22) through the thin membrane (14) which is part of the fluidic chip, thus allowing the heater or Peltier junction (22) to heat or cool the fluid (17) in the fluid cell (12).

In an exemplary embodiment, the substance of interest included in the chip (10) is a water solution. When introduced in the fluid compartment (12), the water solution is in liquid state. Following the introduction of water, the chip (10) can be frozen, e.g. at −80° C., so to that the water solution will assume a frozen state.

When use of the chip is desired, the chip is connected with the Peltier element (22) in the heath sink (20) and the Peltier element can be operated to control state and/or temperature of the water solution in the fluid compartment (12). For example, in one embodiment, the Peltier element (22) can be operated to maintain the water solution in a frozen state. In another embodiment, the Peltier element (22) can be operated to modify the temperature of the water solution, e.g., from −80° C. to a temperature where the water solution is brought to a liquid state.

The modifications can be controlled so that, for example, the water solution can be brought from a frozen state to a liquid state to allow flowing of the fluid from a first fluid compartment to a second fluid compartment, and then maintained in the second fluid compartment at a temperature where the water solution is in liquid state but reagents included in the water solution are inert or at a temperature wherein reagents are active and the reaction occurs.

In another exemplary embodiment connected with the scheme of FIG. 1, the water solution can be brought to a reaction temperature in a fluid compartment for a predetermined amount of time and then brought back to a temperature where no reaction can occur, and/or the solution is in a frozen state.

In particular, in embodiments wherein the substance of interest (17) can be transferred from and/or to the fluid compartment (12), the transfer can be performed through a flow channel (16). In some embodiments an air channel (18) can also be present to allow balancing of the pressure in the fluid compartment (12) and in the flow channel (16) and consequently, fluid flow from/to the compartment.

More in particular, in some embodiments, the microfluidic chip or circuit (10) is arranged such that transfer of the substance of interest from a fluid compartment (12) to another section of the chip is performed using at least in part gravity. The timing of the reaction can be controlled by controlling the transfer of the substance of interest from a compartment to another. For instance, if multiple fluid cells in one chip are arranged such that gravity will cause the substance of interest in liquid form to run into a chamber, and presence of each liquid into a single chamber at a certain time in a certain order will allow a reaction to occur, signals can be sent to each heater or Peltier element connected to each chamber in order to keep the chambers cold until the substance included in the chambers are needed. Signal can be sent to the heating/cooling unit (22) by way of a microcontroller, not shown in the figures.

In some embodiments, the transfer of the substance from one part of the microfluidic circuit to another part upon activation of the Peltier elements (22) or another heating/cooling unit can be performed by applying pressure to the thin membrane, e.g. by pressing the membrane or other suitable methods identifiable by a skilled person.

In some embodiments, the chip (10) and heath sink (20) are held together by a clamp (30). In particular, the clamp (30) pushes the microfluidic circuit (10) into the thermal unit (20), allowing thermal contact between circuit (10) and unit (20).

In some embodiments, in the thermal unit (20) multiple Peltier elements can be configured in association with the heat sink (21) to face multiple sides of the heat sink (21), e.g., as a sandwich from the top and the bottom, so that more chambers can be actuated in a smaller space.

In some embodiments, the clamp (30) can also be used to protect the chip from light.

The microfluidic chip (10) can be any microfluidic chip known in the art wherein fluidic compartments are designed within a chip matrix, including but not limited to high-throughput multi-antigen fluorescence microfluidic assay chips, such as immunoassay-chips made from PDMS or other polymers such as SIFEL, which can provide quantitative blood analysis at clinically relevant levels, such as 10-100 pM.

In accordance with a further embodiment of the present disclosure, a system for thermally controlling a microfluidic circuit (10) is provided, comprising one or more heating/cooling units, e.g. Peltier temperature controlling elements (22), one or more membranes (14) and a heat sink connected to the Peltier elements. The Peltier elements (22) are external to the microfluidic circuit (10). The membranes (14) are connected to the fluidic compartments (12) and interface between the microfluidic circuit (10) and the Peltier temperature controlling elements (22). In particular, the membranes (14) are configured for thermal exchange between the one or more Peltier temperature controlling elements (22) and the fluidic compartments (12). Also the heat sink is external to the microfluidic circuit (10). Thermal exchange between the one or more Peltier temperature controlling elements (22) and the fluidic compartments includes preservation of temperature inside the fluidic compartments (12).

As current is applied to the micro-Peltier junctions, in the Peltier junctions the electric voltage is converted into a thermal differential (Peltier effect) and the chamber can be heated or cooled down accordingly. In particular, in an exemplary circuit including an first Peltier junction and a second Peltier junction connecting two dissimilar metals or semiconductors (A and B) such as n-type and p-type, when a current (I) is passed, the current drives a transfer of heat from the first junction to the second Junction according to the equation $$\dot{Q} = \Pi_{AB} I = (\Pi_B - \Pi_A) I$$

wherein Q is the heat absorbed by the second junction per unit of time, $\Pi_{AB}$ is the Peltier coefficient of the entire thermocouple, $\Pi_A$ is the Peltier coefficient of semiconductor A and $\Pi_B$ is the Peltier coefficient of the semiconductor B.

The Peltier coefficients indicate how much heat current is carried per unit charge through a given material and are identifiable by a skilled person for the materials that are suitable to be used in the devices, methods and systems herein disclosed. Also the appropriate coupling of semiconductors suitable to generate a desired heath flow can be identified by a skilled person on the basis of the difference in the respective Peltier coefficients $\Pi_A$ and $\Pi_B$. Furthermore, a skilled person can also identify how to control the direction of heat transfer by controlling the polarity of the current, and in particular change the direction of transfer (and thus the sign of heat absorbed or evolved) by reversing the polarity of the current.

In the devices, methods and systems herein disclosed, the Peltier element is (directly or indirectly) in thermal communication with a fluidic compartment, in particular through the thin membrane, so that a skilled person can identify a desired thickness of the thin membrane for a predetermined application on the basis of the thermal conductivity and thermal mass of the material forming the membrane.

In some embodiments, the microfluidic chip (10) can be of the type shown in U.S. Ser. No. 11/439,288 "High Throughput Multi-Antigen Microfluidic Fluorescence Immunoassays" filed on May 22, 2006 and incorporated herein by reference in its entirety. Further microfluidic chips, including but not limited to chips made of elastomers or polymers such as PDMS, PMMA, polyurethane, PFPE, SIFEL, parylene, and others identifiable by a skilled person, can be used in the microfluidic assembly disclosed herein.

In some embodiments, those chips are adapted to perform DNA hybridization assays, expression analysis of mRNA, certain forms of DNA detection and/or DNA sequencing (see e.g. Kartalov, Emil P. and Quake, Stephen R. (2004) Microfluidic device reads up to four consecutive base pairs in DNA sequencing-by-synthesis in Nucleic Acids Research, 32 (9). pp. 2873-2879 herein incorporated by reference in its entirety).

Figure 2:
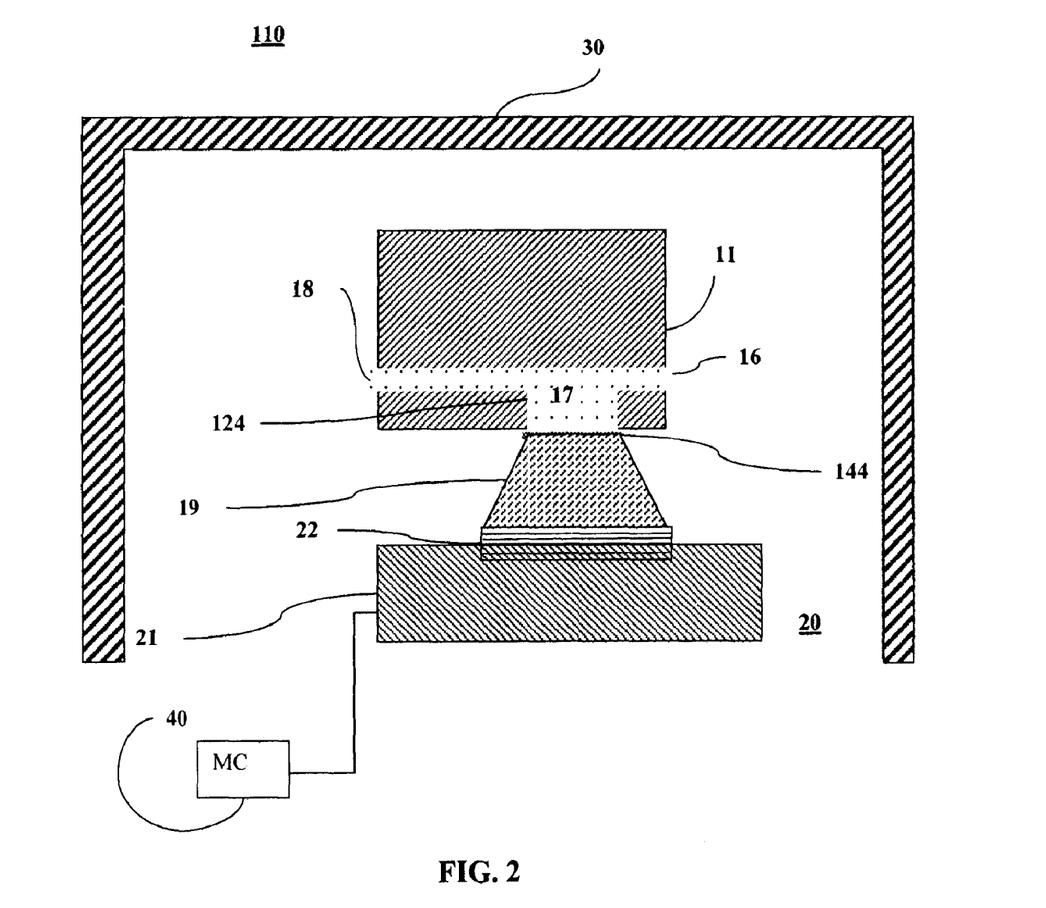
FIG. 2 shows a schematic illustration of a microfluidic assembly in cross sectional view, according to another embodiment herein disclosed.

In some embodiments, the Peltier element is in thermal communication with the compartment through a thermally conductive post as exemplified in FIG. 2. In those embodiments, the Peltier element or other heating cooling unit (22) is not in direct communication with the fluidic compartment (124) and in particular with the thin membrane (144), but the heat is transferred from the Peltier element (22) to the thin membrane (14) and the compartment (124) by the conductive post (19). In some of those embodiments a conductive post connects Peltier elements and fluidic compartments of different sizes and dimensions (see FIG. 2) In some embodiments, the conductive post (19) is made of copper or other suitable thermally and electrically conductive materials and the Peltier element is attached to the conductive post (19) by soldering or other suitable bonding techniques.

Figure 3:
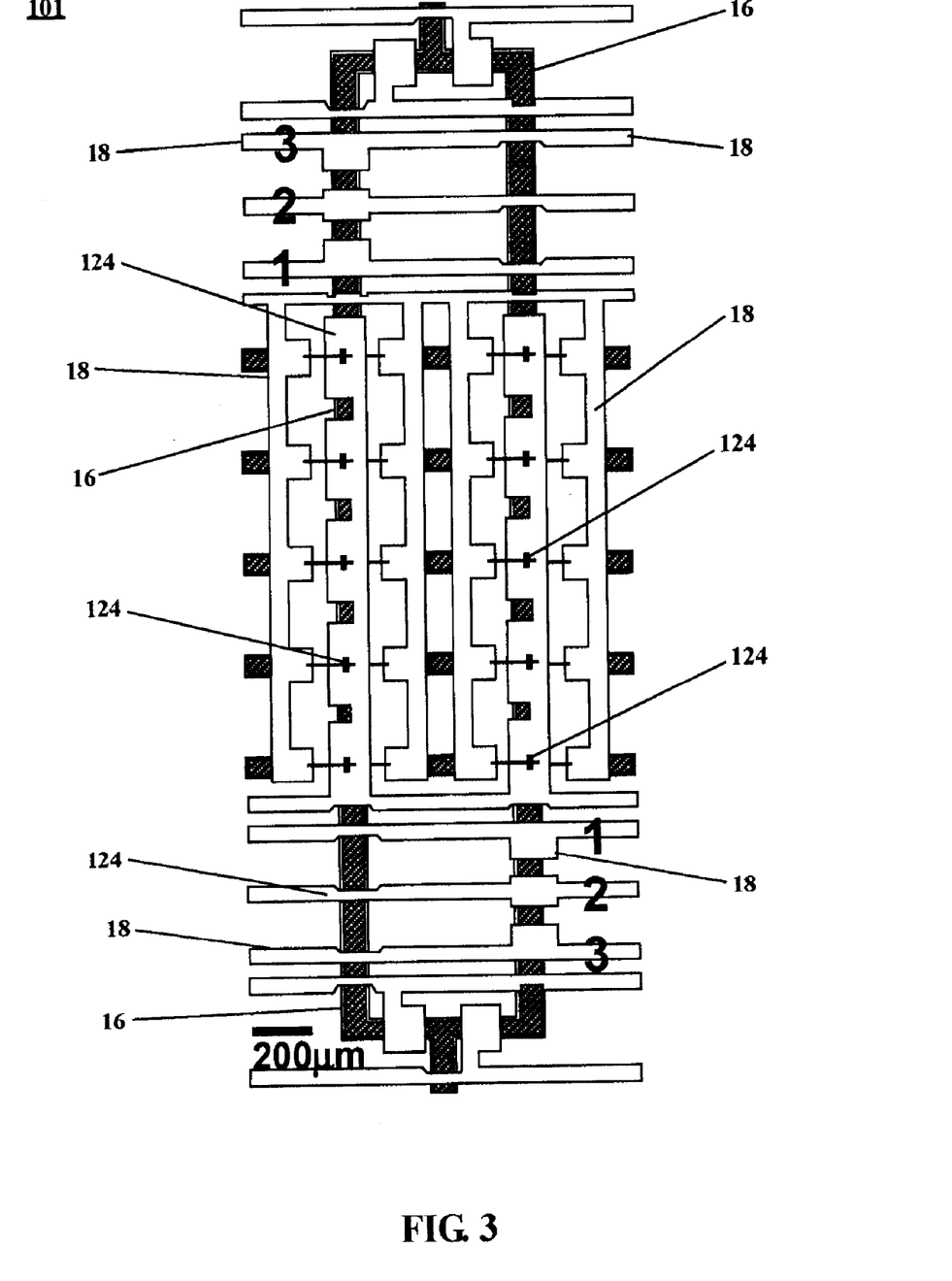
FIG. 3 shows a schematic illustration of an exemplary microfluidic chip in top sectional view, suitable to be included in an assembly according to an embodiment herein disclosed.

Those chips and the related applications are identifiable by a skilled person upon reading of the present disclosure and are illustrated in the exemplary embodiment of FIG. 3.

In the sectional view of FIG. 3, a microfluidic chip or device (101) is illustrated. The device comprises a matrix (11) including a plurality of flow channels (16), (18) defined in the matrix (11) and suitable to introduce a sample and/or reagents in the chip (16) and to control air flow and pressure within the chip (18). The device also comprises a corresponding plurality of selectively controllable, and possibly valved microchambers (124). In the embodiments exemplified in FIG. 3, the chip can be included in a microfluidic assembly herein described, together with one or more thermal units with one or more Peltier elements to be removably matched to one or more chambers (124) to control temperature of substances therein. The flow channels (16) and (18) can allow balancing of the pressure in the chambers (124).

In some embodiments, the chip (10) of FIG. 1 or 2 is adapted to include one or more reagents comprised in storage compartments in a ready-to-use configuration. In those embodiments, multiple fluidic compartments can be comprised in the chip (10) connected to additional compartments in the chip by multiple flow channels, and the compartments are used as storage compartments.

Figure 4:
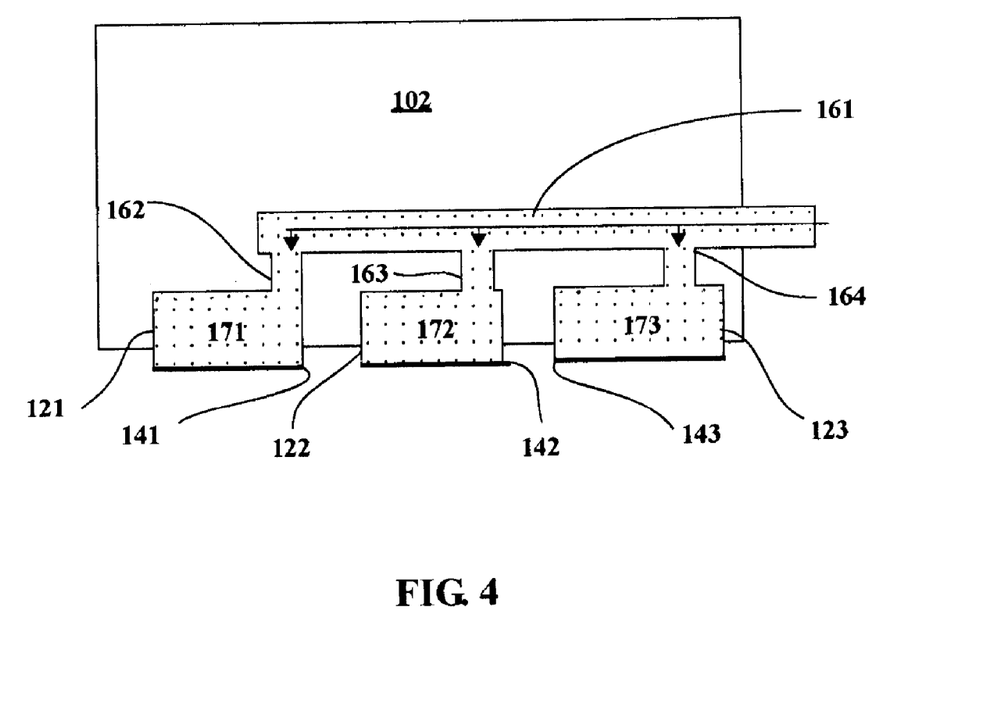
FIG. 4 shows a further schematic illustration a microfluidic chip or device in cross sectional view, according to an embodiment herein disclosed.

In some embodiments, illustrated by the exemplary device of FIG. 4, multiple fluid compartments (121) (122) and (123) can be included in a chip (101), each compartment filled with same or different substances of interest (171), (172) and (173), through flow channels (161) (162), (163) and (164).

Each fluid compartment (121) (122) and (123) is operably connected with a thin membrane (141) (142) and (143) configured to mate a Peltier element (not shown).

In some embodiments, the substances of interest (171), (172) and (173) are different, each including a different reagent or set of reagents to be activated following a predetermined experimental design. A possible use can relate to sample preparation for polymerase chain reaction (PCR), where different buffers, lysis agents and washes have to be used separately and at the appropriate time.

In some embodiments, the substances of interest (171), (172) and (173) can be introduced and frozen in the respective fluid compartment in predetermined portions to be matingly associated with the Peltier elements when the chip (101) is in use, to maximize the efficiency of the chip. In some embodiments, the substances of interest (171), (172) and (173 can be maintained frozen in the compartment. In some embodiments, said substances can be selectively melted through thermal coupling with the Peltier element or another heating/cooling unit operably connected to the respective compartments (121), (122) and (123).

Additionally, the microfluidic chip (101) can be designed such that a fluid filling device with several ports can fill all of the chambers at once as shown in FIG. 4, where a fluid passing through channel (161) enters channels (162), (163) and (164).

In some embodiments, the device of FIG. 4 can use gravity to fill each chamber (121), (122) and (123) and the chip (102) can be frozen standing up. In some embodiments, the substance is introduced in powder state or liquid state. Precise amounts can be filled using techniques known in the art, e.g. pipette type techniques.

Figure 5:
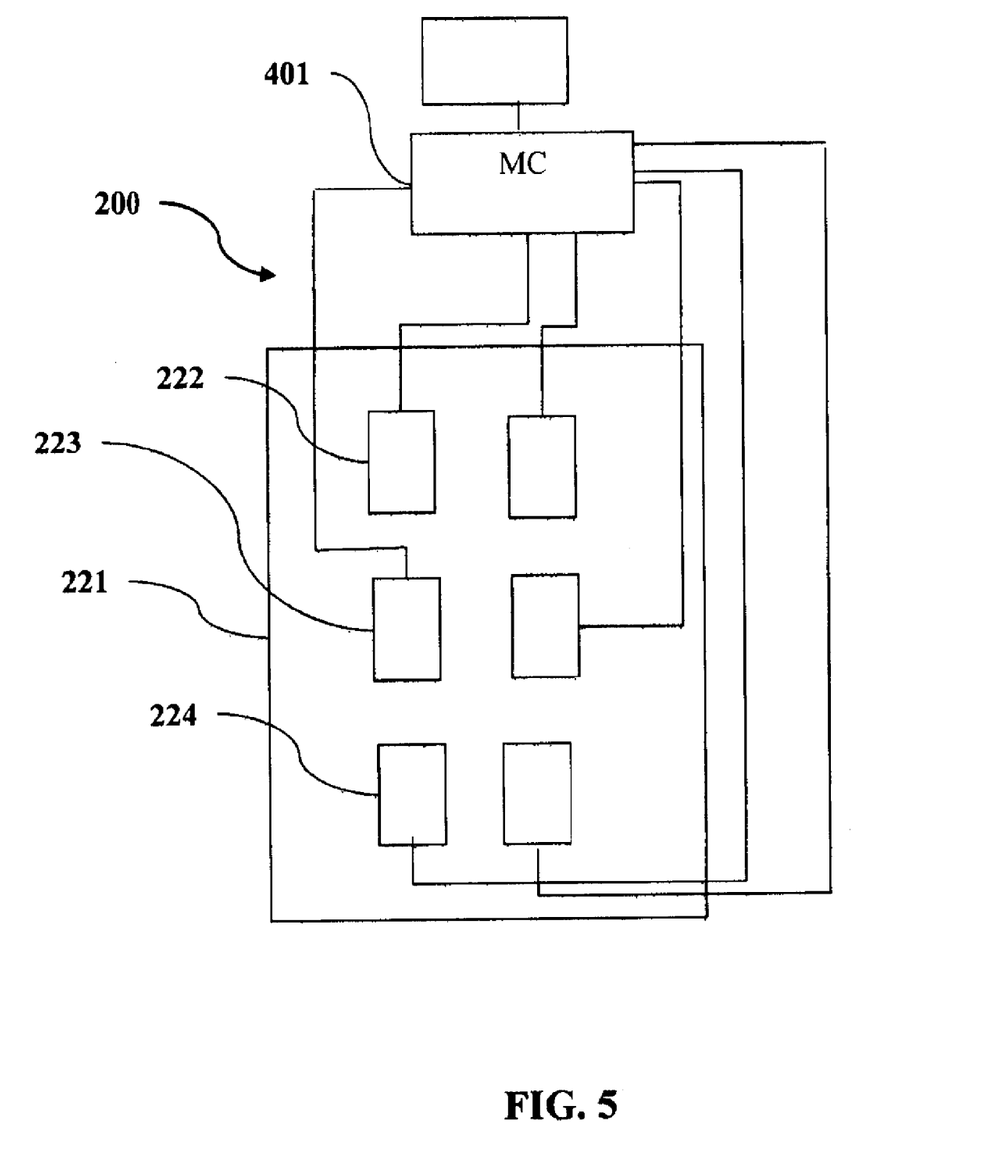
FIG. 5 shows a schematic diagram of an exemplary thermal unit according to an embodiment herein disclosed.

In some embodiments, the thermal unit can include Peltier units in the configuration illustrated in FIG. 5. In the diagrammatic illustration of FIG. 5, a thermal unit (200) comprises a heath sink (221) including a plurality of Peltier elements numbered (222), (223) and (224) connected to a microcontroller (401). The thermal unit (200) can be included in a microfluidic assembly together with a chip such as chip (102) exemplified in FIG. 2, to control the temperature of multiple microfluidic compartments such as compartments (121) (122) and (123) of the chip of FIG. 2. The microcontroller (401) allows selective operation of one or more of the Peltier elements.

The microfluidic assembly herein disclosed can be manufactured using techniques known in the art. In particular, PDMS microfluidic chips with integrated micromechanical valves can be built using soft lithography as described, for example, in "Monolithic Microfabricated Valves and Pumps by Multilayer Soft Lithography", by Marc A. Unger, Hou-Pu Chou, Todd Thorsen, Axel Scherer, Stephen R. Quake, Science 7 Apr. 2000, Vol. 288. no. 5463, pp. 113-116, and "High-throughput multi-antigen microfluidic fluorescence immunoassays by Emil P. Kartalov, Jiang F. Zhong, Axel Scherer, Stephen R. Quake, Clive R. Taylor, and W. French Anderson in Biotechniques 2006 Volume 40, Number 1: pp 85-90, both incorporated herein by reference in their entirety, wherein chambers, thin membrane and connecting channels are designed using processes such as the "lost wax" process known in the art.

In a "lost wax process" a wax mold can be made in a variety of ways, including rapid prototype machining, or by casting a wax mold from an appropriate metal or plastic mold. The matrix can then be derived by pouring the polymer over the wax, and later melting the wax out. This process can be done using wax or any other substance that can be molded, made into a solid, then melted or dissolved out of the chip. The chip can also be machined or molded in two pieces and then the two halves can be bonded together.

Suitable methods for manufacturing the devices herein disclosed are described in US patent published Application 20070012891 and in US patent published Application 20060204699, each incorporated herein by reference in its entirety.

It is to be understood that the disclosures are not limited to particular devices, methods or, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. Unless defined otherwise, all technical and scientific terms used herein have the same meaning as commonly understood by one of ordinary skill in the art to which the disclosure pertains. Although any methods and materials similar or equivalent to those described herein can be used in the practice for testing of the disclosure(s), specific examples of appropriate materials and methods are described herein.

The examples set forth above are provided to give those of ordinary skill in the art a complete and description of how to make and use the embodiments of the devices, methods and systems herein disclosed, and are not intended to limit the scope of what the applicants regard as their disclosure. Modifications of the above-described modes for carrying out the disclosure that are obvious to persons of skill in the art are intended to be within the scope of the following claims. All patents and publications mentioned in the specification are indicative of the levels of skill of those skilled in the art to which the disclosure pertains. All references cited in this application are incorporated by reference to the same extent as if each reference had been incorporated by reference in its entirety individually.

A number of embodiments of the disclosure have been described. Nevertheless, it will be understood that various modifications may be made without departing from the spirit and scope of the disclosure. Accordingly, other embodiments are within the scope of the following claims.

What is claimed is:

1. A microfluidic assembly comprising:
a replaceable microfluidic circuit comprising one or more fluidic compartments each comprised of a membrane; and
a thermal unit comprising at least one temperature controlling element,
wherein the membrane of each of the one or more fluidic compartments is placed on a side of the fluidic compartment to protect the fluidic compartment from an outside environment, and
wherein
the replaceable microfluidic circuit is adapted to contact the thermal unit by contact between the one or more membranes and the at least one temperature controlling element to achieve temperature control of a substance or substances inside the one or more fluidic compartments,
the thermal unit is external to the replaceable microfluidic circuit, and
the thermal unit is configured to be maintained in the microfluidic assembly upon replacement of the replaceable microfluidic circuit, thus allowing multiple uses of the microfluidic assembly.

2. The microfluidic assembly of claim 1, wherein the thermal unit further comprises a heat sink.

3. The microfluidic assembly of claim 1, wherein the at least one temperature controlling element are plural temperature controlling elements disposed on different locations of the thermal unit.

4. The microfluidic assembly of claim 1, wherein contact between the thermal unit and the one or more membranes occurs through a thermally conductive post, the thermally conductive post separating the thermal unit from the replaceable microfluidic circuit.

5. The microfluidic assembly of claim 1, wherein the temperature controlling element is a Peltier element, a resistive heating coil and/or a refrigerated cold plate.

6. The microfluidic assembly of claim 1, wherein the one or more membranes and the at least one temperature controlling element are adapted to be matingly engageable to maximize the temperature control.

7. The microfluidic assembly of claim 1, wherein the membrane is made of a material selected from the group consisting of polymer, elastomer, PDMS SIFEL, and injection molded plastic.

8. The microfluidic assembly of claim 1, wherein some or all of the one or more fluidic compartments have a flat surface, the membrane being flat and connected to the flat surface.

9. The microfluidic assembly of claim 1, wherein the substance is a solution capable of freezing between room temperature and about $-20°$ C.

10. The microfluidic assembly of claim 1, wherein the microfluidic circuit comprises flow channels and air channels connected to reaction chambers formed in the one or more fluidic compartments, the air channels acting as pressure balancing components.

11. The microfluidic assembly of claim 1, further comprising a clamp holding the microfluidic circuit and the thermal unit together.

12. The microfluidic assembly of claim 1, wherein the one or more fluid compartments are plural fluid compartments, wherein flow channels depart from said plural fluid compartments.

13. The microfluidic assembly of claim 12, wherein the flow channels are connected to a common flow channel.

14. The microfluidic assembly of claim 12, wherein substances contained in the plural fluid compartments are same or different.

15. A method to control temperature and/or physical state of a substance, comprising:
providing a first, disposable microfluidic circuit comprising one or more fluidic compartments each comprised of a membrane, the membrane being placed on a side of the fluidic compartment to protect the fluidic compartment from an outside environment, and;
introducing the substance in the one or more fluidic compartments;
thermally coupling the one or more membranes with temperature controlling elements,
replacing the first microfluidic circuit with a second microfluidic circuit; and thermally coupling the second microfluidic circuit with the temperature controlling elements responsible for the previous thermal coupling of the first microfluidic circuit.

16. The method of claim 15, wherein the substance is a solution capable of freezing between room temperature and about $-20°$ C.

17. The method of claim 16, wherein the solution is introduced in a liquid state and later frozen and maintained frozen through the thermal coupling or selectively melted through the thermal coupling.

18. The method of claim 16, wherein the solution includes reagents and wherein the solution and the reagents have different behavior upon the thermal coupling.

19. The method of claim 16, wherein the solution is initially brought to a first temperature and then brought to a second temperature, the second temperature different from the first temperature.

20. The method of claim 15, further comprising: controlling the temperature controlling elements to transfer the substance from one part of the microfluidic circuit to another part of the microfluidic circuit through gravity or by applying pressure on the membrane.

21. The method of claim 15, wherein the microfluidic circuit comprises plural fluidic compartments, and wherein the plural fluidic compartments are filled at the same time.

22. A testing system comprising:
the microfluidic assembly of claim 1,
wherein the replaceable microfluidic circuit is removably coupled to the temperature controlling element.

23. A testing system comprising:
a thermal controlling element; and
a plurality of microfluidic circuits, each microfluidic circuit comprising one or more fluidic compartments each comprised of a membrane;
wherein each membrane is placed on a side of a respective fluid compartment to protect the respective fluidic compartment from an outside environment,
wherein each membrane is adapted to contact the temperature controlling element to perform temperature control of a substance or substances inside the respective fluidic compartment, and
wherein each circuit of the plurality of microfluidic circuits is configured to be removably coupled with the thermal controlling element for a testing operation and to be replaced by a different circuit of the plurality of microfluidic circuits for a different testing operation.

24. A system for controlling temperature inside fluidic compartments of a microfluidic circuit, comprising:
one or more Peltier temperature controlling elements external to the microfluidic circuit;
one or more membranes connected to the fluidic compartments, the membranes interfacing between the microfluidic circuit and the Peltier temperature controlling elements and configured for thermal exchange between the one or more Peltier temperature controlling elements and the fluidic compartments; and
a heat sink connected to the one or more Peltier temperature controlling elements, the heat sink external to the microfluidic circuit,
wherein the heat sink includes a machined seat configured to seat the one or more Peltier temperature controlling elements, only a portion of each the one or more Peltier temperature controlling elements protruding above a surface of the heat sink facing the microfluidic circuit, and
wherein thermal exchange between the one or more Peltier temperature controlling elements and the fluidic compartments includes preservation of temperature inside the fluidic compartments.

25. The system of claim 24, wherein the fluidic compartments are storage compartments.

26. The microfluidic assembly of claim 1, wherein the membrane is part of the replaceable microfluidic circuit and remains attached to the compartment in case of disconnection of the replaceable microfluidic circuit from the thermal unit.

27. The microfluidic assembly of claim 2, comprising a heating/cooling device, wherein the heat sink includes a machined seat adapted to seat the heating/cooling device.

28. The microfluidic assembly of claim 27, wherein only a portion of the heating/cooling device protrudes above a surface of the heat sink facing the replaceable microfluidic circuit.

29. The microfluidic assembly of claim 1, wherein the one or more fluidic compartments are vessels.

* * * * *